United States Patent
Suita et al.

(10) Patent No.: US 6,899,860 B2
(45) Date of Patent: May 31, 2005

(54) PROCESS FOR PRODUCING LITHIUM MANGANATE AND LITHIUM BATTERY USING THE LITHIUM MANGANATE

(75) Inventors: Tokuo Suita, Yokkaichi (JP); Kenzi Kataoka, Yokkaichi (JP)

(73) Assignee: Ishihara Sangyo Kaisha, Ltd., Osaka (JP)

( * ) Notice: Subject to any disclaimer, the term of this patent is extended or adjusted under 35 U.S.C. 154(b) by 398 days.

(21) Appl. No.: 10/168,316

(22) PCT Filed: Dec. 21, 2000

(86) PCT No.: PCT/JP00/09098

§ 371 (c)(1),
(2), (4) Date: Jun. 20, 2002

(87) PCT Pub. No.: WO01/47814

PCT Pub. Date: Jul. 5, 2001

(65) Prior Publication Data

US 2003/0027047 A1 Feb. 6, 2003

(30) Foreign Application Priority Data

Dec. 24, 1999 (JP) ............................................. 11-365928

(51) Int. Cl.⁷ ............................................... C01G 45/12
(52) U.S. Cl. ...................................................... 423/599
(58) Field of Search ............................ 429/224, 231.1; 423/599

(56) References Cited

U.S. PATENT DOCUMENTS 6,334,993 B1 * 1/2002 Suita et al. .................. 423/599

FOREIGN PATENT DOCUMENTS

| JP | 9-194215 | 7/1997 |
| JP | 10-172567 | 6/1998 |
| JP | 10-194745 | 7/1998 |
| JP | 10-297924 | 11/1998 |
| JP | 10-310428 | 11/1998 |
| JP | 11-016574 | 1/1999 |

OTHER PUBLICATIONS

IDPL JPO Machine Translation for JP 11–16574 A (publication date of Jan. 1999).*
IPDL JPO Machine Translation for JP 10–172567 A (publication date of Jun. 1998).*

* cited by examiner

Primary Examiner—Susy Tsang-Foster
(74) Attorney, Agent, or Firm—Paul E. White, Jr.; Manelli Denison & Selter PLLC

(57) ABSTRACT

According to the process of this invention, first a manganese oxide seed is prepared, which is then grown to obtain manganese oxide having large particle diameters. The manganese oxide thus obtained is reacted with a lithium compound, whereby lithium manganate having large particle diameters can be obtained. Since the lithium manganate has large particle diameters and gives a high packing density, lithium batteries with a high energy density can be provided by using the lithium manganate.

18 Claims, No Drawings

PROCESS FOR PRODUCING LITHIUM MANGANATE AND LITHIUM BATTERY USING THE LITHIUM MANGANATE

TECHNICAL FIELD

This invention relates to a process for producing lithium manganate, which is a compound useful as the positive electrode material of a lithium battery, and to a lithium battery obtained by using the lithium manganate produced by the process.

BACKGROUND ART

Lithium secondary batteries have rapidly come into wide use in recent years because they are of high voltage, excellent in charge and discharge characteristics, moreover light in weight and small in size, particularly those having a high electromotive force of 4-V class being strongly demanded. As to such lithium secondary batteries, there are known those which use a complex oxide of cobalt or nickel with lithium as the positive electrode active material; but cobalt and nickel are expensive and moreover have the problem of possible exhaustion of resources in the future.

Lithium manganate, which is a complex oxide of manganese and lithium, represented by the chemical formula $LiMn_2O_4$ and has a spinel type crystal structure, is useful as the positive electrode active material of 4-V class lithium secondary batteries. Furthermore, since manganese of the raw material is inexpensive and is rich in resources, lithium manganate is promising as a material which can replace lithium cobaltate and lithium nickelate.

Positive electrode active materials are kneaded with various additives and then shaped, or additionally incorporated with a solvent to form a paste and then coated on a substrate. Lithium manganate obtained by the conventional wet process is only of small particle diameters and, even when it is subjected to firing to effect particle growth, desired large particles cannot be obtained. Resultantly, it shows a low packing density and cannot be filled in a large amount in a fixed volume, so that it cannot give a product of high energy density. It is generally considered that the packing density of powder increases as its particle diameter is increased (that is, its specific surface area is decreased); accordingly lithium manganate with a large particle diameter is greatly demanded.

JP-A-10-194745 discloses a method of increasing the particle diameter of lithium manganate which comprises mixing a manganese oxide and a lithium salt, and subjecting the mixture to primary fireing, then to a treatment for decreasing crystallinity, e.g., mechanical grinding, and further to secondary fireing. In this method, however, since the reactivity of a manganese compound with a lithium compound is poor, a homogeneous composition can be hardly obtained even when fireing is conducted at high temperatures, and lithium manganate having many lattice defects is produced. Moreover, since the product is a non-uniform sintered body obtained by sintering particles, the particle diameter and the particle shape are difficult to control.

JP-A-10-172567 discloses a method which comprises mixing manganese dioxide or a manganese compound with a lithium compound in an aqueous solution, then drying the mixture with a spray drier, granulating the dried product, followed by fireing JP-A-10-297924 discloses a method which comprises synthesizing lithium manganate powder, then densifying and agglomerating the powder, followed by classification and granulation, and then fireing the granulated product. Though these methods give lithium manganate, which makes the base substance, that has few lattice defects and has a uniform composition, difficulties remain unsolved in that the particle diameter and particle shape are difficult to control and that the particles ultimately obtained are non-uniform sintered bodies.

DISCLOSURE OF THE INVENTION

The object of this invention is to provide, overcoming the difficulties of the prior art described above, a process for producing with industrial and economical advantage lithium manganate suitable for high energy density lithium batteries which has a large particle diameter and shows a high packing density, has a uniform particle diameter and particle shape, and further has few lattice defects and a uniform composition.

After extensive study the present inventors have found that when a manganese compound and a basic compound are reacted with each other in a solution and oxidized to obtain manganese oxide seed, then a manganese compound and a basic compound are reacted with each other in a solution in which the manganese oxide seed is present, the reaction product is oxidized and made to grow to a desired large particle diameter, and the product thus obtained is used for synthesizing lithium manganate, lithium manganate which has a large particle diameter and has a uniform particle diameter distribution and uniform particle shape can be produced, and further that when the above-mentioned manganese oxide and a lithium compound are reacted with each other in a solution, or alternatively a part of manganese of the manganese oxide is replaced by a proton to improve reactivity and the resulting modified manganese oxide is mixed with a lithium compound or reacted therewith in a solution, and the product obtained by either of the reactions is heated and fired, lithium manganate having an excellent crystallinity and large particle diameters can be obtained.

Thus, according to this invention, there are provided a process for producing lithium manganate which comprises (1) the step of reacting a manganese compound with a basic compound to obtain manganese hydroxide, (2) the step of oxidizing the manganese hydroxide to obtain manganese oxide seed, (3) the step of conducting oxidation while reacting a manganese compound with a basic compound in the presence of the manganese oxide seed to cause the particle growth of the manganese oxide seed, (4) the step of reacting the manganese oxide which has undergone particle growth with a lithium compound, or the step of treating the manganese oxide with an acid to obtain proton-substituted manganese oxide and then mixing the proton-substituted manganese oxide with a lithium compound or reacting it with a lithium compound, and (5) the step of firing the reaction product or the mixture obtained above with heating, and a lithium battery which uses the lithium manganate obtained by the process as the positive electrode active material.

BEST MODE FOR CARRYING OUT THE INVENTION

In this invention, as the first step, manganese hydroxide is formed by reacting a manganese compound with a basic compound in a liquid medium such as water. To facilitate the control of the oxidation level in the next, second step, the reaction of forming the manganese hydroxide is preferably conducted in an inert gas atmosphere. The use of nitrogen gas as the inert gas is advantageous both industrially and economically. The manganese compound used in the first step and the third step described later may be either a water-soluble manganese compound or a water-insoluble manganese compound made into an acid solution, but water-soluble one is more preferable. The water-soluble manganese compounds used may be inorganic manganese compounds, such as manganese sulfate, manganese chloride and manganese nitrate, and organic manganese compounds, such as manganese acetate, inorganic manganese compounds being preferred. The basic compound used may be alkali metal hydroxides, such as sodium hydroxide, potassium hydroxide and lithium hydroxide and ammonium compounds, such as ammonia gas and ammonia aqueous solution.

In the first step, the manganese compound may be wholly neutralized with an equimolar or more amount of basic compound, or it may be partially neutralized with a less than equimolar amount of basic compound. Partial neutralization is more preferable because manganese hydroxide formed by partial neutralization of a manganese compound will have an increased particle diameter. When partial neutralization is conducted such that the concentration of manganese ions remaining in the liquid medium after partial neutralization is 5–60 g/l, preferably 10–40 g/l, products having a particularly large particle diameter can be obtained.

In the next, second step, the manganese hydroxide obtained in the first step is oxidized to form manganese oxide seed. As described before, the particle diameter of the manganese oxide seed can be controlled by appropriately setting the concentration of manganese ions which remain in the solution after partial neutralization. When the remaining manganese ion concentration is adjusted to the above-mentioned range of 5–60 g/l, the average particle diameter of the seed comes to be 0.1–0.4 $\mu$m; particularly when the remaining manganese ion concentration is controlled in the range of 10–40 g/l, the particle diameter of the seed reaches the maximum, and the average particle diameter of 0.3–0.4 $\mu$m is attained. Though the oxidation may be conducted in a gas phase after the manganese hydroxide formed has been collected by filtration and washed, it is more advantageously conducted in a liquid phase by blowing an oxidizing gas, such as air, oxygen and ozone, into the liquid or by adding an oxidizing agent, such as aqueous hydrogen peroxide and peroxodisulfates, because then the oxidation can be conducted in succession to the first step.

In the third step, while, in a solution, e.g. an aqueous solution, containing the manganese oxide seed obtained in the second step, a newly added manganese compound or the remaining manganese compound is being reacted with a newly added basic compound, oxidation is conducted as described above by blowing an oxidizing gas into the reaction system or adding an oxidizing agent thereto, thereby to effect the growth of seed particles. In particular, the use of an oxidizing gas is preferable and the use of air as the oxidizing gas is more preferable. Since the growth of particles can be controlled by properly setting reaction conditions, such as the amount of the basic compound added and the method of addition, manganese oxide having a uniform particle size distribution and uniform particle shape can be obtained. Though the oxidation degree of the manganese oxide may be set as desired, it is preferably oxidized to a state represented by the formula $Mn_3O_4$ or $2MnO.MnO_2$.

The manganese compound and the basic compound used are as described for the first step.

Also in the third step, the reaction of the manganese compound with the basic compound may be conducted in the manner of either whole amount neutralization or partial neutralization. Method of whole amount neutralization is industrially more advantageous because virtually no unreacted manganese compound remains behind. In partial neutralization, manganese oxide having fine particle diameters is hardly formed, so that the method is advantageous for obtaining a product having a uniform shape and particle size distribution. When partial neutralization is conducted for example, the concentration of manganese ions remaining after the partial neutralization in the liquid medium is preferably controlled to be in the range of 5–60 g/l, more preferably 10–40 g/l; the solution of the manganese compound and the solution of the basic compound are preferably added in parallel because more uniform particles are formed thereby.

In the fourth step, the manganese oxide which has undergone particle growth and a lithium compound are reacted with each other in a liquid medium, such as water, or the manganese compound which has undergone particle growth is treated with an acid to obtain proton-substituted manganese oxide, which is then reacted with a lithium compound in a liquid medium, such as water; thus a lithium manganate precursor is formed. Alternatively, the proton-substituted manganese compound is mixed with a lithium compound in a solid phase to form a mixture. It is preferable that, in advance to the reaction with a lithium compound, the manganese oxide is treated beforehand with an acid and converted into proton-substituted manganese oxide, because the reactivity with the lithium compound is improved thereby. Though the proton-substituted manganese oxide may be mixed with a lithium compound either in a liquid phase or, after having been collected by filtration, in a solid phase, it is more preferable to react the two compounds with each other in a liquid medium, such as water, to form a lithium manganate precursor. The term "lithium manganate precursor" refers not to a mere mixture of a manganese oxide and a lithium compound but to a substance wherein lithium ions have been incorporated into the crystal structure of manganese oxide as described later.

The lithium compounds which may be used in the fourth step are, for example, lithium hydroxide, lithium nitrate, lithium carbonate, lithium hydrogen carbonate, lithium chloride and lithium sulfate. Particularly preferred among them are basic compounds, such as lithium hydroxide, because of their excellent reactivity. The composition ratio of manganese to lithium in the intended lithium manganate may be controlled by the reaction amounts of the above-mentioned compounds corresponding thereto. For example, when a proton-substituted manganese compound is reacted with a lithium compound in an aqueous medium, the reaction amounts of the both compounds can be determined by measuring the alkali concentration of the reaction liquid sampled in a small portion.

The proton-substituted manganese oxide referred to in this invention is a substance which is formed by treating manganese oxide with an acid and in which presumably a part of manganese ions in the manganese oxide have been replaced by hydrogen ions. It is estimated that the substituted hydrogen ions are active and are readily exchangeable with other cations. When the proton-substituted manganese oxide is reacted with a lithium compound, lithium ions are readily incorporated into the manganese oxide through exchange reaction with hydrogen ions. Though the acid used in the acid treatment is not particularly limited and may be inorganic acids, such as hydrochloric acid, sulfuric acid, nitric acid and hydrofluoric acid, and organic acids, such as acetic acid and formic acid, inorganic acids are preferred because they are highly effective, sulfuric acid or hydrochloric acid being more preferred because the acid treatment can be conducted with industrial advantage. The concentration of the acid added is preferably 0.05–10N. Acid concentration lower than the above-mentioned range is industrially disadvantageous because the necessary amount of the acid to be added tends to be too large and the slurry concentration tends to be too low. Acid concentration higher than the range is unfavorable because then the manganese oxide tends to decompose readily.

When manganese oxide and a lithium compound, or proton-substituted manganese oxide and a lithium compound, are reacted with each other in a liquid medium such as water, the reaction may be conducted usually in the range of 70–250° C. In this instance, for example, when the temperature is not higher than 100° C., the reaction may be conducted under atmospheric pressure and hence does not need the use of a pressure reaction vessel, which offers a practical advantage; on the other hand, a temperature not lower than 100° C. is advantageous in that the reaction proceeds more readily. The preferred temperature range is 80–230° C. and the more preferred range is 85–180° C. In a reaction at 100° C. or above, a pressure vessel, such as an autoclave, is used and a hydrothermal treatment may be applied under saturated steam pressure or under pressurization. The reaction proceeds readily when air, oxygen, ozone, etc. as an oxidizing gas, or aqueous hydrogen peroxide, peroxodisulfates, etc. as an oxidizing agent, are supplied to the reaction system. Particularly, the use of an oxidizing gas is preferable and the use of air as the oxidizing gas is more preferable.

The proton-substituted manganese oxide may also be merely mixed with a lithium compound and used as such in the next, fifth step.

In the fifth step, a lithium manganate precursor, or a mixture of proton-substituted manganese oxide with a lithium compound, is fired with heating to produce lithium manganate. In this invention, since in the third step the manganese oxide particles have been grown nearly to the particle diameter of the intended large-particle lithium manganate, the fireing temperature requires only to be not lower than the temperature at which the phase change of these materials to lithium manganate takes place. Though the firing temperature may vary depending on the composition and particle size of the above-mentioned precursor or the mixture, the firing atmosphere, and other factors, it is generally not lower than 250° C., preferably not higher than 850° C to prevent sintering and more preferably not lower than 280° C. and not higher than 800° C. The firing atmosphere is not particularly limited so long as it is an oxygen-containing atmosphere, such as air; the oxygen partial pressure may be set as required.

The lithium manganate obtained by firing with heating may be subjected, according to necessity, to grinding or crushing, or to densifying. The method for densification is not particularly limited. The densification may be conducted either by compression forming using an edge runner mill, screen forming machine, extrusion forming machine, pressure roll, mixing mill, etc. or by stirring-granulation using a mixer, etc.

The lithium manganate obtained by the process of this invention is a compound represented by the formula $Li_xMn_yO_4$, wherein the value of X/Y is preferably in the range of 0.3–1.5. Particularly preferred are those which have a spinel-type crystal structure and are represented by the formulas $LiMn_2O_4$, $Li_{4/3}Mn_{5/3}O_4$ or the like. The lithium manganate may comprise either of a single phase of lithium manganate or of a mixture of lithium manganate with manganese oxide.

The lithium manganate of this invention has a uniform particle size distribution and uniform particle shape, and has a large average particle diameter of 0.4–50 $\mu$m, preferably 0.8–30 $\mu$m, more preferably 1–20 $\mu$m, so that it shows a high packing density; for example, it shows a bulk density of 1.5–2.2 g/cc as determined by tapping. Accordingly, it can be filled as a positive electrode active material in a large amount into moldings or pastes, so that when the resulting electrode is used as the positive electrode, a lithium battery having a high energy density is obtained. When the particle diameter is smaller than the above-mentioned range, an intended packing density cannot be obtained; when it is larger than the range, the lithium battery obtained by using the lithium manganate cannot have intended characteristic property. The average particle diameter referred to herein was determined by the laser scattering method and the specific surface area by the BET method.

Next, this invention provides a lithium battery which uses the above-mentioned lithium manganate as the positive electrode active material. The lithium batteries referred to in this invention is a primary battery using lithium metal for the negative electrode, a chargeable secondary battery using lithium metal for the negative electrode and a chargeable lithium ion secondary battery using a carbonaceous material, tin compound, lithium titanate, etc. for the negative electrode. Since the lithium manganate of this invention has few lattice defects and is excellent in crystallinity, when it is used particularly as the positive electrode active material of a lithium secondary battery, a positive electrode is obtained which hardly undergoes disintegration of crystals at the time of charge and discharge, and gives excellent battery characteristics. Further, when the lithium manganate of this invention which has a crystal structure comprising mainly the spinel structure is used, 3-V class lithium secondary batteries which can be charged and discharged in a voltage region of about 2–3.5V and 4-V class ones for which the voltage region is about 3.5–4.5V can be obtained; such lithium manganate is particularly useful for 4-V class batteries.

The positive electrode for lithium batteries, when it is used for coin type batteries, may be obtained by adding to the lithium manganate powder of this invention carbonaceous conductive materials, such as acetylene black, carbon and graphite powder, and binders, such as polytetrafluoroethylene resin and polyvinylidene fluoride, and kneading and molding the resulting mixture. To be used for cylindrical or square batteries, the positive electrode may be obtained by adding to the lithium manganate powder of this invention organic solvents, such as N-methylpyrrolidone, in addition to the above-mentioned additives, kneading the resulting mixture into the form of paste, and coating the paste on a metallic current collector, such as aluminum foil, followed by drying.

The electrolyte used for a lithium battery may be a solution of lithium ions dissolved in a polar organic solvent which is electrochemically stable, that is, neither oxidized nor reduced in a voltage range wider than the range in which it works as a lithium ion battery. The polar organic solvent used may be, for example, propylene carbonate, ethylene carbonate, diethyl carbonate, dimethoxyethane, tetrahydrofuran, γ-butyrolactone, and the liquid mixtures thereof. The solute which is used as the lithium ion source may be, for example, lithium perchlorate, lithium hexafluorophosphate and lithium tetrafluoroborate. Porous polypropylene film or polyethylene film is placed as a separator between the electrodes.

The batteries include, for example, those of coin type which are obtained by placing a separator between a pellet-formed positive electrode and negative electrode, pressure-bonding the resulting assembly to a sealable can provided with a gasket made of polypropylene, pouring an electrolyte into the can, and tightly sealing the can, and those of cylindrical type obtained by coating the positive electrode material and the negative electrode material on a metallic current collector, coiling the current collector with a separator held therebetween, placing the resulting assembly in a battery can provided with a gasket, pouring an electrolyte into the can, and sealing the can. Further, there is known a three-electrode type battery intended for determining the electrochemical characteristics of a battery. This battery is provided with a reference electrode besides the positive electrode and the negative electrode and is used for evaluating the electrochemical characteristics of the respective electrodes by controlling the voltages of other electrodes against the reference electrode.

For evaluation of the performance characteristics of lithium manganate as a positive electrode material, a secondary battery may be constructed by using metallic lithium or the like as the negative electrode and its capacity can be determined by charging and discharging at a constant current in a suitable voltage range. Further, by repeating charge and discharge, its cycle characteristic property can be judged from the change of the capacity.

Embodiments

This invention is described in detail below with reference to Examples, but the invention is in no way limited thereto.

EXAMPLE 1

1. Synthesis of Manganese Hydroxide

In a reaction vessel made of stainless steel were placed 2.57 l of an 8.5 mol/l sodium hydroxide solution and 1.805 l of water. While nitrogen gas was being blown thereinto at a rate of 5 l/min, a solution of 3.744 kg of manganese sulfate (88.06% content in terms of $MnSO_4$) dissolved in 15 kg of water was rapidly added thereto to effect neutralization, with stirring, at 70° C. and aged for 3 hours to obtain manganese hydroxide. The concentration of manganese ions remaining in the solution after the neutralization was 30 g/l.

2. Synthesis of Manganese Oxide Seed

Into the solution containing manganese hydroxide obtained above, with stirring, was blown an air-nitrogen (1:1) gas mixture at a rate of 5 l/min to effect oxidation at a temperature of 70° C., and the oxidation was finished at the time when the pH had reached 6.4. Thus, a manganese oxide seed was prepared.

3. Growth of Manganese Oxide Seed

While the solution containing manganese oxide obtained above was kept at 70° C. and stirred, an air-nitrogen (1:1) gas mixture was blown thereinto at a rate of 5 l/min, and an aqueous solution of 3.744 kg of manganese sulfate (88.06% content in terms of $MnSO_4$) dissolved in 16.843 kg of water and 2.57 l of an 8.5 mol/l sodium hydroxide solution were concurrently added thereto over 16 hours to effect neutralization and oxidation, thus to make the manganese oxide seed grow. When the pH had reached 6.4, a 20 l portion of the slurry was withdrawn, and, successively, while an air-nitrogen (1:1) gas mixture was being blown into the slurry, an aqueous manganese sulfate solution and a sodium hydroxide solution were concurrently added thereto according to the same procedure as described above, to effect further growth of the manganese oxide seed. When the pH had reached 6.4 the growth reaction was finished, and the solid in the reaction mixture was collected by filtration and washed with water to obtain manganese oxide. The concentration of manganese ions remaining in the solution at the completion of reaction was 30 g/l. (Sample a).

4. Synthesis of Proton-Substituted Manganese Oxide

A slurry of manganese oxide (700 g in terms of Mn) dispersed in water was placed in a stainless steel reaction vessel and warmed to 60° C. Into the slurry was added with stirring 2.039 l of 1 mol/l sulfuric acid over 1 hour; thereafter the resulting mixture was allowed to react for 2 hours, then filtered and washed with water to obtain proton-substituted manganese oxide.

5. Synthesis of Lithium Manganate Precursor

To a slurry of the proton-substituted manganese oxide (500 g in terms of Mn) dispersed in water was added 5.448 mols of lithium hydroxide monohydrate and dissolved therein, then water was added to the slurry to make a volume of 1.667 l, and the resulting slurry was placed in a glass reaction vessel. Air was blown into the slurry at a rate of 2 l/min and, with stirring, the slurry was heated to 90° C. and allowed to react for 5 hours. Then the reaction mixture was transferred to an autoclave and subjected to a hydrothermal treatment at 130° C. for 3 hours. The hydrothermally treated slurry was again placed in a glass reaction vessel and, while air was being blown thereinto at a rate of 2 l/min to effect stirring, was further allowed to react at 90° C. for 1 hour. After the reaction, the slurry was cooled to a temperature of 60° C., then filtered and washed with 2 l of a 0.1 mol/l lithium hydroxide solution to obtain a lithium manganate precursor.

6. Firing of Lithium Manganate Precursor

The lithium manganate precursor was dried at 110° C. for 12 hours and then fired in air at 750° C. for 3 hours to obtain lithium manganate.

7. Densification of Lithium Manganate

Two hundred grams of lithium manganate fired above was subjected to grinding and densifying for 30 minutes on a small edge runner mill (mfd. by YOSHIDA SEISAKUSYO CO., LTD.). (Sample A)

EXAMPLE 2

1. Synthesis of Manganese Hydroxide

Manganese hydroxide was obtained according to the same method as in Example 1.

2. Synthesis of Manganese Oxide Seed

A manganese oxide seed was obtained according to the same method as in Example 1.

3. Growth of Manganese Oxide Seed

The solution containing the manganese oxide seed obtained above was heated to 70° C. and, with stirring, an air-nitrogen gas mixture (1:1) was blown thereinto at a rate of 5 l/min. At the same time, an aqueous solution of 3.744 kg of manganese sulfate (88.06% content in terms of $MnSO_4$) dissolved in 16.843 kg of water and 2.570 l of an 8.5 mol/l sodium hydroxide solution were concurrently added thereto over 16 hours while the pH was kept at 6.5–7.5, to effect neutralization and oxidation and thus to make the manganese oxide seed grow. When the pH had reached 6.4, a 20 l portion of the slurry was withdrawn and, while an air-nitrogen gas mixture (1:1) was being blown into the slurry, an aqueous manganese sulfate solution and a sodium hydroxide solution was concurrently added thereto according to the same procedure as described above to effect further growth of the manganese oxide seed. When the pH had reached 6.4, a 20 l portion of the slurry was again withdrawn and successively, while an air-nitrogen gas mixture (1:1) was being blown into the slurry at a rate of 5 l/min, an aqueous solution of 1.872 kg of manganese sulfate (88.06% content in terms of $MnSO_4$) dissolved in 8.422 kg of water and 1.285 l of an 8.5 mol/l sodium hydroxide solution were concurrently added thereto over 8 hours while the pH was kept at 6.5–7.5, to effect further growth of manganese oxide seed. When the pH had reached 6.4, the growth reaction was finished, and the solid in the slurry was collected by filtration and washed with water to obtain manganese oxide. The concentration of manganese ions remaining in the solution at the completion of reaction was 30 g/l. (Sample b)

4. Synthesis of Proton-Substituted Manganese Oxide

A slurry of manganese oxide (700 g in terms of Mn) dispersed in water was placed in a stainless steel reaction vessel and warmed to 60° C. Into the slurry was added with stirring 2.039 l of 1 mol/l sulfuric acid over 1 hour; thereafter the resulting mixture was allowed to react for 2 hours, then filtered and washed with water to obtain proton-substituted manganese oxide.

5. Synthesis of Lithium Manganate Precursor

To a slurry of the proton-substituted manganese oxide (500 g in terms of Mn) dispersed in water was added 5.429 mols of lithium hydroxide monohydrate and dissolved therein, then water was added to the slurry to make a volume of 1.25 l, and the resulting slurry was placed in a glass reaction vessel. Air was blown into the slurry at a rate of 2 l/min and, with stirring, the slurry was heated to 90° C. and allowed to react for 5 hours. Then the reaction mixture was transferred to an autoclave and subjected to a hydrothermal treatment at 130° C. for 3 hours. The hydrothermally treated slurry was again placed in a glass reaction vessel and, while air was being blown thereinto at a rate of 2 l/min to effect stirring, was further allowed to react at 90° C. for 1 hour. After the reaction, the slurry was cooled to a temperature of 60° C., then filtered and washed with 2 l of a 0.1 mol/l lithium hydroxide solution to obtain a lithium manganate precursor.

6. Firing of Lithium Manganate Precursor

Lithium manganate was obtained according to the same method as in Example 1.

7. Densification of Lithium Manganate

The lithium manganate was subjected to densification according to the same method as in Example 1. (Sample B)

EXAMPLE 3

1. Synthesis of Manganese Hydroxide

A solution of 3.744 kg of manganese sulfate (88.06% content in terms of $MnSO_4$) dissolved in 16.84 kg of water was placed in a stainless steel reaction vessel. Nitrogen gas was blown into the solution at a rate of 5 l/min, the solution was heated to 70° C., and 2.57 l of an 8.5 mol/l sodium hydroxide solution was added thereto with stirring over 1 hour to effect neutralization. Thereafter the reaction mixture was aged for 2 hours to obtain a solution containing manganese hydroxide. The concentration of manganese ions remaining in the solution after neutralization was 30 g/l.

2. Synthesis of Manganese Oxide Seed

A manganese oxide seed was obtained according to the same method as in Example 1.

3. Growth of Manganese Oxide Seed

The solution containing the manganese oxide seed obtained above was heated to 70° C., then, with stirring, an air-nitrogen (1:1) gas mixture was blown thereinto at a rate of 5 l/min, an aqueous solution of 3.744 kg of manganese sulfate (88.06% content in terms of $MnSO_4$) dissolved in 16.843 kg of water and 2.57 l of an 8.5 mol/l sodium hydroxide solution was added over 16 hours, to effect neutralization and oxidation, and thus to make the manganese oxide seed grow. When the pH had reached 6.4, a 20 l portion of the slurry was withdrawn. While an air-nitrogen (1:1) gas mixture was being blown into the slurry at a rate of 5 l/min, an aqueous manganese sulfate solution and a sodium hydroxide solution were added thereto according to the same procedure as described above, to effect further growth of manganese oxide seed. When the pH had reached 6.4, a 20 l portion of the slurry was again withdrawn and, while successively an air-nitrogen (1:1) gas mixture was being blown into the slurry at a rate of 5 l/min, manganese sulfate and sodium hydroxide were added again according to the same procedure as described above, to effect further growth of manganese oxide seed. When the pH had reached 6.4 the growth reaction was finished, and the slurry was filtered and washed with water to obtain manganese oxide. The concentration of manganese ions remaining in the solution at the completion of reaction was 30 g/l. (Sample c)

4. Synthesis of Proton-Substituted Manganese Oxide

Proton-substituted manganese oxide was obtained according to the same method as in Example 2.

5. Synthesis of Lithium Manganate Precursor

The proton-substituted manganese oxide (500 g in terms of Mn) was dispersed in water, thereto was added 5.373 mols of lithium hydroxide monohydrate and dissolved therein, then water was added thereto to make a volume of 1.111 l, and the resulting slurry was placed in a glass reaction vessel. Air was blown thereinto at a rate of 2 l/min, and the slurry was heated to 90° C. with stirring, then allowed to react for 5 hours, thereafter transferred to an autoclave, and subjected to a hydrothermal treatment at 130° C. for 3 hours. The hydrothermally treated slurry was placed again in a glass reaction vessel, air was blown thereinto at a rate of 2 l/min, and the reaction was continued with stirring at 90° C. for 1 hour. After the reaction, the reaction mixture was cooled to 60° C., then filtered and washed with 2 l of a 0.1 mol/l lithium hydroxide solution to obtain a lithium manganate precursor.

6. Firing of Lithium Manganate Precursor

Lithium manganate was obtained according to the same method as in Example 1.

7. Densification of Lithium Manganate

Densification was conducted according to the same method as in Example 1. (Sample C)

EXAMPLE 4

1. Synthesis of Manganese Hydroxide

Manganese hydroxide was obtained according to the same method as in Example 3.

2. Synthesis of Manganese Oxide Seed

A manganese oxide seed was obtained according to the same method as in Example 1.

3. Growth of Manganese Oxide Seed

To the solution containing the manganese oxide seed obtained above was added 40.260 kg of water while nitrogen gas was being blown thereinto at a rate of 5 l/min, further 11.231 kg of manganese sulfate (88.06% content in terms of $MnSO_4$) was added, and the resulting mixture was stirred to dissolve the manganese sulfate. The resulting solution was heated to 70° C., then, with stirring, nitrogen gas was changed to an air-nitrogen (1:1) gas mixture and the gas mixture was blown thereinto at a rate of 5 l/min. Successively, 17.99 l of an 8.5 mol/l sodium hydroxide solution was added over 64 hours to effect neutralization and oxidation and thus to make the manganese oxide seed grow. When the pH had reached 8.5 the growth reaction was finished, and the reaction mixture was filtered and washed with water to obtain manganese oxide. The concentration of manganese ions remaining in the solution at the completion of reaction was 0 g/l. (Sample d)

4. Synthesis of Proton-Substituted Manganese Oxide

Proton-substituted manganese oxide was obtained according to the same method as in Example 1.

5. Synthesis of Lithium Manganate Precursor

The proton-substituted manganese oxide (500 g in terms of Mn) was dispersed in water, 5.373 mols of lithium hydroxide monohydrate was added thereto and dissolved therein, then water was added thereto to make a volume of 1.111 l, and the resulting mixture was placed in a glass reaction vessel. Air was blown thereinto at a rate of 2 l/min and, with stirring, the reaction mixture was heated to 90° C. and allowed to react for 15 hours. After the reaction, the reaction mixture was cooled to 60° C., then filtered, and washed with 2 l of a 0.1 mol/l lithium hydroxide solution to obtain a lithium manganate precursor.

6. Firing of Lithium Manganate Precursor

Lithium manganate was obtained according to the same method as in Example 1.

7. Crushing Treatment of Lithium Manganate

One hundred grams of lithium manganate after burning was crushed in an agate mortar. (Sample D)

COMPARATIVE EXAMPLE 1

1. Synthesis of Manganese Hydroxide

A solution of 2.397 kg of manganese sulfate (88.06% content in terms of $MnSO_4$) dissolved in 17.8 kg of water was placed in a stainless steel reaction vessel. Nitrogen gas was blown into the solution at a rate of 5 l/min, the solution was heated to 70° C., and 6.825 l of a 4 mol/l sodium hydroxide solution was added thereto with stirring over 1 hour to effect neutralization and thus to obtain manganese hydroxide. The concentration of manganese ions remaining in the solution after neutralization was 0 g/l.

2. Synthesis of Manganese Oxide

While the solution containing manganese hydroxide obtained above was being stirred, air was blown into the solution at a rate of 5 l/min to effect oxidation at a temperature of 70° C. and, when the pH had reached 7.0, air was changed to nitrogen to finish the oxidation. Thereafter the reaction mixture was filtered and washed with water to obtain manganese oxide. (Sample e)

3. Acid Treatment of Proton-Substituted Manganese Oxide

Proton-substituted manganese oxide was obtained according to the same method as in Example 1.

4. Synthesis of Lithium Manganate Precursor

To a slurry of the proton-substituted manganese oxide (500 g in terms of Mn) dispersed in water was added 5.675 mols of lithium hydroxide monohydrate and dissolved therein, then water was added to the slurry to make a volume of 3.846 l, and the slurry was placed in a glass reaction vessel. Air was blown in at a rate of 3 l/min and, with stirring, the slurry was heated to 90° C. and allowed to react for 10 hours. After the reaction, the slurry was cooled to 60° C., then filtered and washed with 2 l of a 0.1 mol/l lithium hydroxide solution to obtain a lithium manganate precursor.

5. Firing of Lithium Manganate Precursor

Lithium manganate was obtained according to the same method as in Example 1 except that the firing of lithium manganate precursor was conducted at 800° C. for 3 hours.

6. Densification of Lithium Manganate

Densification was conducted according to the same method as in Example 1 (Sample E)

COMPARATIVE EXAMPLE 2

Lithium manganate was obtained according to the same method as in Comparative Example 1 except that the firing of lithium manganate precursor was conducted at 850° C. for 3 hours. (Sample F)

COMPARATIVE EXAMPLE 3

Lithium manganate was obtained according to the same method as in Comparative Example 1 except that the firing of lithium manganate precursor was conducted at 900° C. for 3 hours. (Sample G)

Evaluation 1

The manganese oxide seed, or manganese oxide (samples a-e), and lithium manganate (samples A-G) obtained in Examples 1–4 and Comparative Examples 1–3 were determined for their specific surface areas by using a specific surface area measuring apparatus (Monosorb, a trade name, mfd. by Yuasa Ionics Inc.) and according to the BET method.

Evaluation 2

The aqueous slurries of the manganese oxide seed, or manganese oxide (samples a-e), and lithium manganate (samples A-G) obtained in Examples 1–4 and Comparative Examples 1–3 were sufficiently dispersed ultrasonically so as to attain transmittance by laser light of 85±1%, and then determined for their average particle diameters by using a particle size distribution measuring apparatus of laser diffraction-scattering system (LA-90, a trade name, mfd. by HORIBA, Ltd.) by volume base.

Evaluation 3

Each 50 g of the lithium manganate (samples A–G) obtained in Examples 1–4 and Comparative Examples 1–3 was placed in a 100-ml measuring cylinder and tapped 100 times to determine the tap density.

Evaluation 4

Lithium secondary batteries wherein lithium manganate (samples A–G) obtained in Examples 1–4 and Comparative Examples 1–3 was used as the positive electrode active material were evaluated for their charge and discharge characteristics and cycle characteristics. The batteries were of a three-electrode system and were subjected to repeated charge and discharge. The shape of the batteries and the determination conditions are described below.

Each of the above-mentioned samples was mixed with graphite powder as a conductive material and polytetrafluoroethylene resin as a binder in a weight ratio of 3:2:1, then kneaded together in a mortar, and formed into a disk 14 mm in diameter, to obtain a pellet. The weight of the pellet was 50 mg. The pellet was held between metallic titanium meshes and pressed at a pressure of 14.7 MPa, to be used as a positive electrode.

On the other hand, a metallic lithium sheet 0.5 mm in thickness was formed into a disk 14 mm in diameter, which was held between metallic nickel meshes and pressure-bonded to be used as a negative electrode. Separately, metallic lithium foil 0.1 mm in thickness was wound round a metallic nickel wire so as to be approximately the size of rice grain, to be used as a reference electrode. As a non-aqueous electrolyte was used a solvent mixture of 1,2-dimethoxyethane and propylene carbonate (1:1 by volume) containing lithium perchlorate dissolved therein in a concentration of 1 mol/l. The electrodes were arranged in the order of positive electrode, reference electrode and negative electrode, and porous polypropylene film was placed therebetween as a separator.

The charge and discharge capacity was determined at constant current with voltage set in the range of 4.3 V–3.5 V and charge and discharge current set at 0.26 mA (about 1 cycle/day). As to cycle characteristics, the charge and discharge capacities at the second cycle and the 11th cycle were determined, and the cycle characteristic was expressed by the capacity retention rate in charge or discharge (%) [{1—(charge or discharge capacity at the second cycle—charge or discharge capacity at the 11th cycle)/charge or discharge capacity at the second cycle}×100].

Table 1 shows the specific surface areas and average particle diameters of Samples a–e, Table 2 the specific surface areas, average particle diameters and tap densities of Samples A–G, Table 3 the initial charge and discharge characteristics and cycle characteristics of the Samples A–G.

TABLE 1

| | Sample | Specific surface area ($m^2/g$) | Average particle diameter ($\mu m$) |
|---|---|---|---|
| Example 1 | a | 1.57 | 4.44 |
| Example 2 | b | 1.59 | 4.81 |
| Example 3 | c | 1.05 | 5.78 |
| Example 4 | d | 1.13 | 5.66 |
| Comparative Example 1 | e | 21.50 | 0.51 |

TABLE 2

| | Sample | Specific surface area ($m^2/g$) | Average particle diameter ($\mu m$) | Tap density ($g/cm^3$) |
|---|---|---|---|---|
| Example 1 | A | 2.84 | 3.00 | 1.85 |
| Example 2 | B | 2.75 | 3.46 | 1.98 |
| Example 3 | C | 2.37 | 4.72 | 2.00 |
| Example 4 | D | 1.05 | 6.02 | 2.02 |
| Comparative Example 1 | E | 3.70 | 1.80 | 1.61 |
| Comparative Example 2 | F | 3.00 | 4.01 | 1.82 |
| Comparative Example 3 | G | 0.60 | 7.31 | 2.00 |

TABLE 3

| | | Initial charge discharge characteristics | | | Cycle characteristic capacity retention rate (%) | |
|---|---|---|---|---|---|---|
| | Sample | Charge capacity (mAh/g) | Discharge capacity (mAh/g) | Efficiency (%) | Charge | Discharge |
| Example 1 | A | 114.4 | 112.8 | 98.6 | 96.0 | 95.9 |
| Example 2 | B | 116.2 | 114.9 | 98.9 | 97.9 | 96.8 |
| Example 3 | C | 119.0 | 117.0 | 98.4 | 96.6 | 97.2 |
| Example 4 | D | 116.1 | 114.6 | 98.7 | 97.2 | 97.5 |
| Comparative Example 1 | F | 117.2 | 116.9 | 98.9 | 93.2 | 92.8 |
| Comparative Example 2 | F | 105.4 | 103.2 | 97.9 | 88.2 | 87.6 |
| Comparative Example 3 | G | 100.2 | 98.8 | 98.6 | 85.0 | 82.1 |

INDUSTRIAL APPLICABILITY

In the process of this invention, at a step precedent to the production of lithium manganate, manganese oxide seed are prepared and made to grow in a solution to form manganese oxide having large particle diameters. Since intended large particles can be obtained at this step, the particle diameters and particle shapes of the final product can be made more uniform as compared in the prior method wherein large particles are formed by sintering lithium manganate; moreover the particle diameters and particle shapes can be easily controlled by properly setting the conditions of seed growth reaction. Furthermore, since the manganese oxide which has undergone particle growth and a lithium compound are reacted with each other in a solution or, alternatively, proton-substituted manganese oxide obtained by acid-treating the above-mentioned manganese oxide is reacted with a lithium compound, lithium manganate having excellent crystallinity and uniform composition can be obtained. The lithium manganate obtained by the process of this invention has large particle diameters as described above, shows a high packing density and can provide a lithium battery with a high energy density by using it as the positive electrode active material.

What is claimed is:

1. A process for producing lithium manganate which comprises (1) the step of reacting a manganese compound with a basic compound to obtain manganese hydroxide, (2) the step of oxidizing the manganese hydroxide to obtain manganese oxide seed, (3) the step of conducting oxidation while reacting a manganese compound with a basic compound in the presence of the manganese oxide seed to cause the particle growth of the manganese oxide seed, (4) the step of reacting the manganese oxide which has undergone particle growth with a lithium compound, or the step of treating the manganese oxide with an acid to obtain proton-substituted manganese oxide and then mixing the proton-substituted manganese oxide with a lithium compound or reacting it with a lithium compound and (5) the step of firing a reaction product or a mixture obtained above with heating.

2. The process for producing lithium manganate according to claim 1 wherein the lithium manganate has an average particle diameter of 0.4–50 $\mu m$.

3. The process for producing lithium manganate according to claim 1 wherein in reacting the manganese compound with the basic compound in the first step, partial neutralization is conducted.

4. The process for producing lithium manganate according to claim 3 wherein the partial neutralization is conducted such that the concentration of manganese ions remaining in the solution after the partial neutralization becomes 5–60 g/l.

5. The process for producing lithium manganate according to claim 1 wherein, in the second step, oxidation is conducted with an oxidizing gas or an oxidizing agent.

6. The process for producing lithium manganate according to claim 5 wherein the oxidizing gas is air, oxygen or ozone and the oxidizing agent is an aqueous hydrogen peroxide solution or a peroxodisulfate.

7. The process for producing lithium manganate according to claim 1 wherein, in the third step, partial neutralization is conducted at the time of reacting the manganese compound with the basic compound.

8. The process for producing lithium manganate according to claim 7 wherein the partial neutralization is conducted such that the concentration of manganese ions remaining in the solution after the partial neutralization becomes 5–60 g/l.

9. The process according to claim 1 wherein, in the third step, a solution of the manganese compound and a solution of the basic compound are concurrently added to a solution containing the manganese oxide seed.

10. The process for producing lithium manganate according to claim 1 wherein, in the third step, oxidation is conducted with an oxidizing gas or an oxidizing agent.

11. The process for producing lithium manganate according to claim 10 wherein the oxidizing gas is air, oxygen or ozone, and the oxidizing agent is an aqueous hydrogen peroxide solution or a peroxodisulfate.

12. The process for producing lithium manganate according to claim 1 wherein, in the fourth step, the acid used for treating the manganese oxide is at least one member selected from the group consisting of hydrochloric acid, sulfuric acid, nitric acid and hydrofluoric acid.

13. The process for producing lithium manganate according to claim 1 wherein, in the fourth step, the reaction of the manganese oxide or the proton-substituted manganese oxide with the lithium compound is conducted by means of hydrothermal treatment.

14. The process for producing lithium manganate according to claim 1 wherein, in the fourth step, the reaction of the manganese oxide or the proton substituted manganese oxide with the lithium compound is conducted while an oxidizing gas or oxidizing agent is being supplied to the reaction system.

15. The process for producing lithium manganate according to claim 14 wherein the oxidizing gas is air, oxygen or ozone, and the oxidizing agent is an aqueous hydrogen peroxide solution or a peroxodisulfate.

16. The process for producing lithium manganate according to claim 1 wherein, in the fifth step, a product obtained by firing is subjected to densification.

17. The process for producing lithium manganate according to claim 1 wherein the manganese compound is at least one member selected from the group consisting of manganese sulfate, manganese chloride and manganese nitrate.

18. The process for producing lithium manganate according to claim 1 wherein the lithium compound is at least one member selected from the group consisting of lithium hydroxide, lithium carbonate, lithium hydrogen carbonate, lithium chloride and lithium sulfate.

* * * * *